R. DIESEL.
INTERNAL COMBUSTION PROPULSION APPARATUS.
APPLICATION FILED SEPT. 21, 1910.
1,080,625.  Patented Dec. 9, 1913.
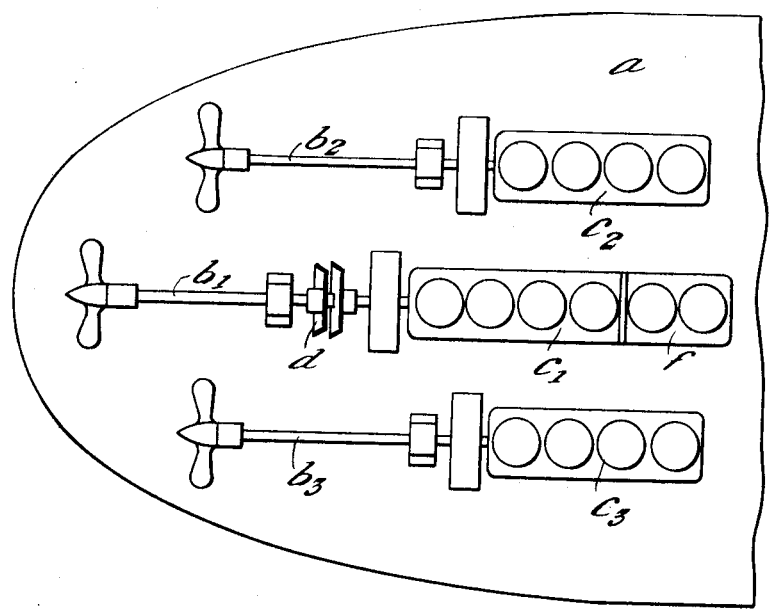
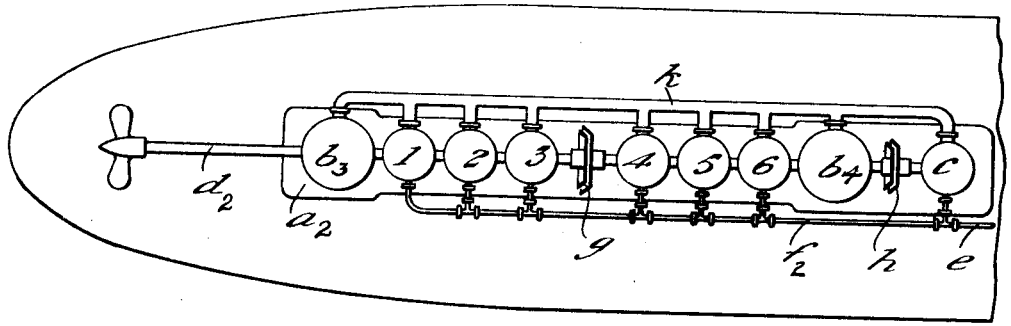
WITNESSES
INVENTOR

UNITED STATES PATENT OFFICE.

RUDOLF DIESEL, OF MUNICH, GERMANY, ASSIGNOR TO BUSCH-SULZER BROS.-DIESEL ENGINE COMPANY, OF ST. LOUIS, MISSOURI, A CORPORATION OF MISSOURI.

INTERNAL-COMBUSTION PROPULSION APPARATUS.

1,080,625. Specification of Letters Patent. Patented Dec. 9, 1913.

Application filed September 21, 1910. Serial No. 583,064.

*To all whom it may concern:*

Be it known that I, RUDOLF DIESEL, a subject of the King of Bavaria, residing at 32 Maria-Theresia-strasse, Munich, in the Kingdom of Bavaria, Germany, engineer, have invented certain new and useful Improvements in Internal-Combustion Propulsion Apparatus, of which the following is a specification.

The maneuvering of ships driven by internal combustion engines has hitherto involved considerable difficulties, because this kind of engine is liable to misfire at slow speed and in starting under load. Assistance has been sought from the provision of a number of air reservoirs containing highly compressed air so that in starting, maneuvering and running backward the combustion in the engine is cut off and the necessary turning moment derived from the compressed air until a speed is attained at which the internal combustion engine becomes again of service. The air reservoirs are again filled with compressed air at the desired pressure by an air pump connected with the engines during normal running, it is obvious that such a system involves storage of a large quantity of air and therefore numerous and heavy air reservoirs and that it does not avoid the danger of misfiring in the installation. In war ships which necessitate frequent and lengthy maneuvering such a system does not suffice, or indeed in heavy ships generally, because the amount of air required is so considerable that the system becomes impracticable.

The present invention relates to installations of internal combustion machinery in general, and particularly to cases where the machinery may at times be employed for maneuvering ships or like vessels, or for driving motor cars or locomotives at slow speed, and it comprises an installation having a divided engine plant, one part of which may compress air for driving the other part as a compressed air motor. In the best embodiment of the invention the combined power output of both parts of the internal combustion engine plant may be utilized to propel the vessel during normal running, while for maneuvering, etc., one part of the engine plant is connected with the propelling mechanism and operates as a compressed air motor, while the other part continues to function as an internal combustion engine and drives an air compressor which supplies the motive fluid for the aforesaid part. By an installation according to the present invention the disadvantages of the older systems are avoided.

The invention is illustrated in the accompanying diagrammatic plans of suitable installations.

In Figure 1, $a$ is the hull of the ship, $b_1$, $b_2$, $b_3$, are three propeller shafts each driven by a corresponding internal combustion engine $c_1$, $c_2$, $c_3$; and $d$ is a coupling of any suitable construction by which the middle propeller can be connected with its engine as desired.

When the ship is to be started, maneuvered or driven at low speed the coupling $d$ is disconnected whereupon the engine $c_1$ becomes independent and therefore constitutes a separate group of cylinders which can produce compressed air by means of compressor $f$, while the other groups of cylinders $c_2$ and $c_3$ are used as compressed air engines for maneuvering the ship. The groups $c_2$ and $c_3$ can be worked for maneuvering either with compressed air alone or, in order that there may not be too much cooling, with compressed air used simultaneously with introduction and igniting of fuel according to any known method. In the groups $c_2$ and $c_3$ it is also possible to work one single cylinder or several cylinders with admission of fuel, while the other cylinders, which operate without fuel are driven separately or together by the compressed air produced by the air compressor $f$.

When the ship has merely two engines one of them is used in the uncoupled position for the production of compressed air and the other is coupled with the propeller to serve as the maneuvering engine. When the ship has merely one engine, a part of it is uncoupled for the production of compressed air, and the other part, which remains coupled with the propeller serves as the maneuvering group.

The air pump or compressor represented by $f$ can obviously be used for producing compressed air for other purposes besides maneuvering, both during normal running and when the ship is being maneuvered. Such compressed air is necessary, for example, with Diesel engines, for the purpose of injecting combustible into the cylinder or for the purpose of filling the compressed air vessels for starting. In warships compressed air is also required for launching torpedoes, for filling the accumulators and like purposes. The engine $c_1$ and its air compressor $f$ can also be mounted entirely independently from any propeller, the propeller $b_1$ then being omitted. In this case the internal combustion cylinders of the whole plan, are in action during the normal running of the ship. During the normal running they produce compressed air for the combustion process of the driving cylinders $c_2$ and $c_3$, for instance for injecting combustible or charging air or the like, and during maneuvering they produce the compressed air for working the driving cylinders $c_2$ and $c_3$ as compressed air engines. Obviously the independent engine $c_1$ can be composed of one single or several combustion cylinders.

Fig. 2 illustrates another example of the invention; $a_2$ is a propelling engine with six internal combustion cylinders numbered 1 to 6 adapted to be subdivided into two groups of three cylinders each by disconnection of the coupling $g$. In this case it is assumed that the engines operate on a two-stroke cycle and receive their charging air or scavenging air from the pumps $b_3$ and $b_4$ through duct $k$. $c$ is a single stage or multistage air pump driven from the shaft of cylinders 4, 5, 6 and adapted to be thrown in and out of work by means of the coupling $h$. This air pump delivers compressed air into the duct $e$ for the general purposes of the ship and air for maneuvering through duct $f_2$, to the cylinders 1 to 6. In normal running all these cylinders unite in driving the propeller shaft $d_2$. In maneuvering and running at low speed as has been already described, the coupling $g$ is disconnected, whereupon the cylinder group 4, 5, 6 which drives the pump $c$ is rendered independent of the propeller shaft and the compressed air produced by the pump $c$ passes through duct $f_2$ to the group of cylinders 1, 2, 3 for maneuvering. Since the last named cylinders 1, 2, 3 run as compressed air engines during maneuvering they do not require charging air from the pumps $b_3$ and $b_4$ and as these pumps are still running the pressure in the scavenging duct $k$ rises; since the latter duct is also the air intake duct for pump $c$, the output of the latter is increased correspondingly with the rising pressure in duct $k$. It follows that during running at low speed and maneuvering the consumption of charging air in the internal combustion cylinders may be diminished and the charging air thus obtained may be further compressed to serve as maneuvering air or for other purposes. It is also possible during the maneuvering to cut off either one side of the charging pumps $b_3$ and $b_4$ or one of the charging pumps completely from the internal combustion cylinders and to use it for producing maneuvering air. When several internal combustion cylinders are wholly cut out during maneuvering they may be caused to serve as compression pumps by correspondingly adjusting the distribution of the valves and may force air for maneuvering into the duct $k$ (Fig. 2). By these several means it is possible not only to increase the maneuvering air as desired, but also the air for other purposes, such as the injecting air in the case of Diesel engines; such an increase of injecting air permits also an increase of combustible, that is to say an enlargement of the diagram and a temporary forcing of the output.

The consumption of charging air in the internal combustion cylinders may also be diminished during the maneuvering period by adjusting suitably the distribution of the cylinder valves, for example by advancing the cut off or by throttling the scavenging valve or in any other known manner. In this manner the charging air can be economized in the internal combustion cylinders and the excess forwarded as charging air in the air pump $c$ and there further compressed for maneuvering.

Both the installations herein described are applicable not merely to ships but, within reason, to any other kind of vehicle, such as locomotives or motor cars. The arrangements are also applicable to stationary installations where it is frequently necessary to start and stop the engine or to run at low speed, as in the case of winding engines of mines or the like.

Having thus described the nature of the said invention and the best means I know of carrying the same into practical effect, I claim:—

1. In apparatus of the kind described, an internal combustion engine plant comprising two divisions, an air compressor arranged for operation by one division and propelling mechanism adapted for operation by the other division, in combination with suitable means for driving the latter division by means of the air from the compressor, and means for combining both divisions to operate the said propelling mechanism.

2. In apparatus of the kind described, the combination with driven mechanism, of internal combustion engine groups adapted to drive said mechanism by their combined impulses, one of said groups being disconnectible from said driven mechanism and adapted to run independently of the other group or groups, an air compressor to be driven by said disconnectible group, and supply connections from said compressor to the other group or groups for operating the latter as compressed air engines.

3. In a ship, the combination with propelling mechanism, of an internal combustion engine plant comprising parts adapted to propel the ship by their combined impulses, one of said parts being adapted to operate optionally as a combustion engine or as a compressed air engine and another part being disconnectible from the propelling mechanism and adapted to supply compressed air for the operation of the other part as a compressed air engine.

4. In apparatus of the kind described, propelling mechanism, an internal combustion engine plant comprising a divisional part adapted for driving connection with such mechanism and having an air pump for supplying itself with charging air, said part being adapted for operation as a compressed air engine or as a combustion engine, in combination with a second divisional part of said plant, an air compressor driven thereby having its suction line leading from said air pump supply of charging air and its force pipe leading to the cylinders of the first mentioned divisional part to operate the same.

5. In apparatus of the character described, the combination of an internal combustion engine plant comprising two divisions which when coupled act as one, means for uncoupling and coupling them, one of said divisions being capable of operating optionally either as an internal combustion or compressed air engine, and means whereby the other division may be employed to compress air to drive the aforesaid division.

6. In a power plant, in combination with a drive shaft, a divided internal combustion engine the parts of which are adapted to rotate the drive shaft by their combined impulses, a clutch for coupling and uncoupling the divisions of the engine, one part of the engine remaining connected to the drive shaft and the other part being disconnected from the shaft so as to run independently thereof when the clutch is uncoupled, an air pump connected with the latter part, and means for supplying compressed air from said pump to the part which remains connected with the drive shaft.

7. In a ship having a plurality of propellers, a combustion engine unit for each propeller, one of the same being disconnectible from its propeller and provided with an air pump adapted to supply the other unit or units with air for operation as compressed air engines.

In testimony whereof I have signed my name to this specification in the presence of two subscribing witnesses.

RUDOLF DIESEL.

Witnesses:
A. V. W. COTTER,
MATHILDE K. HELD.